United States Patent
Sayed

(10) Patent No.: US 11,148,618 B2
(45) Date of Patent: Oct. 19, 2021

(54) VEHICLE SEAT COMPLETE WIRE HARNESS WITH OPTIMIZED HARNESS ROUTING

(71) Applicant: GM Global Technology Operations LLC, Detroit, MI (US)

(72) Inventor: Rami Z. Sayed, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 96 days.

(21) Appl. No.: 16/515,527

(22) Filed: Jul. 18, 2019

(65) Prior Publication Data

US 2021/0016726 A1  Jan. 21, 2021

(51) Int. Cl.
| | | |
|---|---|---|
| B60R 16/02 | (2006.01) | |
| B60R 16/03 | (2006.01) | |
| B60N 2/06 | (2006.01) | |

(52) U.S. Cl.
CPC .......... *B60R 16/0215* (2013.01); *B60N 2/06* (2013.01); *B60R 16/03* (2013.01)

(58) Field of Classification Search
CPC . B60R 16/0215; B60R 16/03; B60R 16/0207; B60R 16/02; B60N 2/06; B60N 2/04
USPC .................................................... 297/217.3
See application file for complete search history.

(56) References Cited

U.S. PATENT DOCUMENTS

| | | | | |
|---|---|---|---|---|
| 6,429,544 | B1* | 8/2002 | Sasaki | B60N 2/0224 307/10.1 |
| 6,781,058 | B1* | 8/2004 | DeCicco | E05D 15/1047 174/72 A |
| 10,214,167 | B2* | 2/2019 | Kimura | B60R 16/027 |
| 2004/0159764 | A1* | 8/2004 | Oshima | B60N 2/067 248/429 |
| 2005/0062310 | A1* | 3/2005 | Kida | B60R 16/0215 296/56 |
| 2006/0170244 | A1* | 8/2006 | Blase | F16G 13/16 296/155 |
| 2008/0142260 | A1* | 6/2008 | Yamaguchi | H02G 11/00 174/72 A |
| 2013/0001374 | A1* | 1/2013 | Kida | H02G 11/00 248/70 |
| 2015/0360629 | A1* | 12/2015 | Sekino | B60R 16/0215 174/68.3 |
| 2018/0174704 | A1* | 6/2018 | Sugino | H01B 7/0045 |
| 2019/0168698 | A1* | 6/2019 | Nakamura | H02G 3/086 |
| 2019/0176724 | A1* | 6/2019 | Yamashita | H02G 3/263 |

\* cited by examiner

*Primary Examiner* — Mark R Wendell

(57) ABSTRACT

A vehicle seat wiring harness system includes a vehicle seat having a wiring bundle connected to at least an electrical motor energized to displace the vehicle seat and a first fixed point. A wire harness chain is positioned between the first fixed point and a second fixed point connected to a vehicle floor member. The wire harness chain includes multiple links individually including a first connecting wall oppositely positioned with respect to a second connecting wall. A longitudinal cavity is defined between the first connecting wall and the second connecting wall of successive ones of the multiple links. Multiple wires are loosely routed through the longitudinal cavity of the wire harness chain and connected to the wiring bundle.

18 Claims, 3 Drawing Sheets

VEHICLE SEAT COMPLETE WIRE HARNESS WITH OPTIMIZED HARNESS ROUTING

INTRODUCTION

The present disclosure relates to automobile vehicle power seats and wiring harnesses to permit seat motion.

Automobile vehicles commonly have occupant seats which are capable of motion in multiple directions including front-to-back, up-and-down, and angular tipping. Such seats utilize wiring harnesses to route wiring for items such as motor electrical power and position command control signals. The wiring harnesses can also include wiring for communication and entertainment systems such as communication screens and radio and Internet systems. The wiring harnesses accommodate length and flexibility to permit the front-to-back, up-and-down, and angular tipping motions of the seats and to allow for predetermined minimum cycles of seat operation without wire fracture.

Wiring harnesses are commonly positioned below the seats within a space envelope between seat support structure and structure of or a covering over of the vehicle floor. Wiring harnesses, similar to wire bundles, commonly wrap multiple wires together to retain all wires within a space envelope or bundle. This bundling adds stiffness to the collective grouping of wires and can result in stress points which can cause wire fracture along the wires of the wiring harness or bundle, particularly at wiring connection ends which are fixed in location with respect to a floor wiring harness entrance or a seat connection. Vertical clearance to position the wiring harness between the vehicle floor and an underside of the seat to alleviate stress points may be limited without undesirably impacting a height of the vehicle roof. Below-seat space may be further limited for wiring harness passage by inclusion of other items such as ventilation ducting and floor channels used for components routed beneath the vehicle floor.

Thus, while current vehicle seat wiring harnesses achieve their intended purpose, there is a need for a new and improved system and method for routing a wiring harness to a vehicle seat.

SUMMARY

According to several aspects, a vehicle seat wiring harness system comprises a vehicle seat having a wiring bundle supported by a structural member supporting the vehicle seat defining a first fixed point. A wire harness chain is connected to the first fixed point and extends to a second fixed point connected to a vehicle floor member. The wire harness chain has a longitudinal cavity. Multiple wires are loosely routed through the longitudinal cavity of the wire harness chain and are connected to the wiring bundle.

In another aspect of the present disclosure, the wire harness chain includes multiple links, the multiple links interconnected using a male pin extending from a face of one of the links received in an aperture of a next successive one of the links.

In another aspect of the present disclosure, the links individually include a first connecting wall oppositely positioned with respect to a second connecting wall, the longitudinal cavity created between the first connecting wall and the second connecting wall and extending throughout a length of the wire harness chain.

In another aspect of the present disclosure, a gap is created between the first connecting wall of successive ones of the links of the wire harness chain, the gap having a width predetermined to preclude portions of the multiple wires from extending through the gap in the links past the first connecting wall as the wire harness chain flexes.

In another aspect of the present disclosure, a minimum bend radius of the wire harness chain is predetermined to ensure stress points causing fracture of the multiple wires do not occur along the multiple wires within the longitudinal cavity during a maximum flexure of the wire harness chain.

In another aspect of the present disclosure, flexibility for the multiple wires routed through the wire harness chain allows for motion of the vehicle seat in a forward direction and an opposite rearward direction.

In another aspect of the present disclosure, the flexibility for the multiple wires is provided between the first fixed point and the second fixed point by a predetermined maximum deflection of the wire harness chain.

In another aspect of the present disclosure, the wire harness chain is connected at the first fixed point defining a motor bridge using a fastener.

In another aspect of the present disclosure, the wire harness chain is connected at the second fixed point defining a vehicle floor structure using a fastener.

In another aspect of the present disclosure, the multiple wires within the wire harness chain include at least one power supply wire connected to an electrical motor providing motive force to displace the vehicle seat, at least one seat position sensor wire and at least one seat position communication wire.

According to several aspects, a vehicle seat wiring harness system comprises a vehicle seat having a wiring bundle connected to at least an electrical motor energized to displace the vehicle seat and a first fixed point. A wire harness chain is positioned between the first fixed point and a second fixed point connected to a vehicle floor member. The wire harness chain includes multiple links individually including a first connecting wall oppositely positioned with respect to a second connecting wall. A longitudinal cavity is defined between the first connecting wall and the second connecting wall of successive ones of the multiple links. Multiple wires are loosely routed through the longitudinal cavity of the wire harness chain and connected to the wiring bundle.

In another aspect of the present disclosure, the successive ones of the multiple links are interconnected using a male pin extending from a face of one of the links received in an aperture of a next successive one of the links.

In another aspect of the present disclosure, a minimum flex width of the wire harness chain between opposed links during a maximum flexure of the wire harness chain is predetermined to fit within a space envelope provided between the vehicle seat and the vehicle floor member.

In another aspect of the present disclosure, the minimum flex width defines a minimum bend radius of the wire harness chain.

In another aspect of the present disclosure, the wire harness chain is fixed at the first fixed point using a first fastener and is fixed at the second fixed point using a second fastener.

In another aspect of the present disclosure, a flexure loop is incorporated in the wire harness chain between the first fixed point and the second fixed point.

In another aspect of the present disclosure, a lateral position of the flexure loop changes as the vehicle seat displaces in a forward direction and an opposed rearward direction.

According to several aspects, a vehicle seat wiring harness system includes a vehicle seat having a wiring bundle connected to at least an electrical motor energized to displace the vehicle seat and a first fixed point. A wire harness chain is positioned between the first fixed point and a second fixed point connected to a vehicle floor member. The wire harness chain includes multiple links individually including a first connecting wall oppositely positioned with respect to a second connecting wall. A flexure loop is incorporated in the wire harness chain between the first fixed point and the second fixed point between the vehicle seat and the vehicle floor member. A longitudinal cavity is defined between the first connecting wall and the second connecting wall extending through successive ones of the multiple links and the flexure loop. Multiple wires are loosely routed through the longitudinal cavity of the wire harness chain from the second fixed point to the first fixed point and connected to the wiring bundle.

In another aspect of the present disclosure, the flexure loop displaces during operation of the electrical motor to displace the vehicle seat.

In another aspect of the present disclosure, a minimum flex width of the wire harness chain between opposed links across the flexure loop during a maximum flexure of the wire harness chain is predetermined to fit within a space envelope provided between the vehicle seat and the vehicle floor member.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
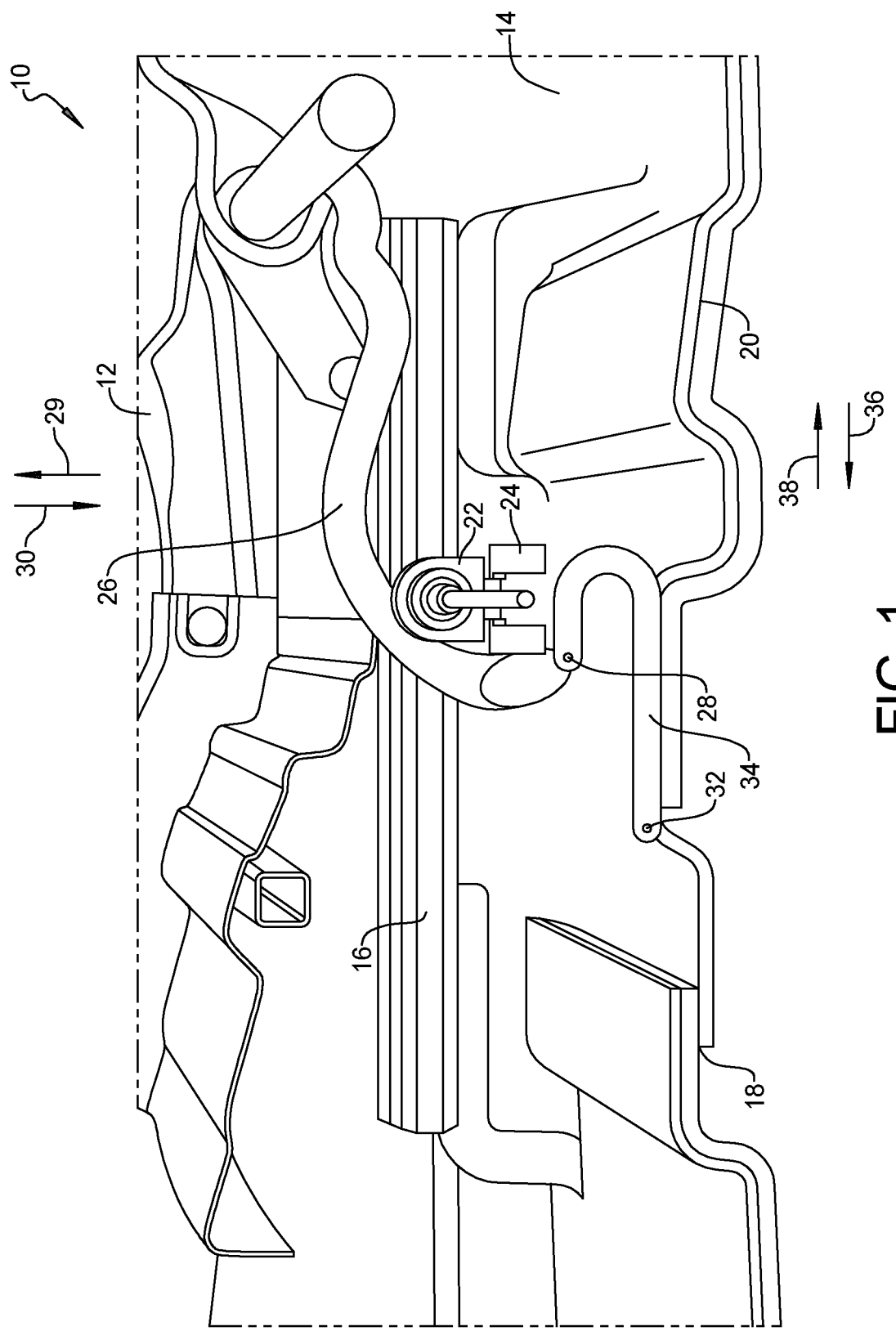
FIG. 1 is a side elevational perspective view of a vehicle seat wiring harness system according to an exemplary aspect.

Referring to FIG. 1, a vehicle seat wiring harness system 10 is provided for a vehicle seat 12 mounted to an automobile vehicle 14. The vehicle seat 12 is mounted to a seat frame 16 having base members which allow front-to-back sliding motion of the vehicle seat 12. The seat frame 16 may be connected to floor structure of the of the automobile vehicle 14, for example to a floor two-bar 18 and to a floor three-bar 20. The seat frame 16 may include a second base member (not visible in this view) positioned parallel to the base member shown.

Motion of the vehicle seat 12 is provided by operation of at least one electric motor 22. The electric motor 22 is mounted to a motor bridge 24 which may be connected to the seat frame 16 and therefore laterally displaces as the vehicle seat 12 displaces. Electrical power, seat position signals and seat position change command signals are provided to the electric motor 22 via a flexible wiring bundle 26. The wiring bundle 26 ends at a first fixed point 28, fixed with respect to the motor bridge 24 or to the seat frame 16. The wiring bundle 26 is therefore designed to provide flexibility starting at the first fixed point 28 for displacement of the vehicle seat 12 in an upward direction 29 and an opposite downward direction 30. An amount of upward and downward displacement of the vehicle seat 12 and therefore an amount of flexibility required for the wiring bundle 26 can vary between different vehicles and different vehicle seats.

Electrical power and seat command signals are provided at a second fixed point 32, for example where vehicle wiring is connected to or extends through the vehicle floor, such as at the floor two-bar 18. According to several aspects, a wire harness chain 34 is provided between the first fixed point 28 and the second fixed point 32 to provide flexible electrical connection between the first fixed point 28 and the second fixed point 32. Individual power wires, signal wires, and control wires are loosely routed within the wire harness chain 34 as shown and described in greater detail in reference to FIG. 2. Loosely routed as defined herein refers to wires individually positioned, without connection between any of the wires within the wire harness chain 34. While the vehicle seat 12 moves in the upward direction 29 and the opposite downward direction 30, the flexibility for which is provided by the wiring bundle 26, the vehicle seat 12 also displaces in a forward direction 36 and an opposed rearward direction 38. Flexibility for the wires extending through the wire harness chain 34 to allow vehicle seat motion in the forward direction 36 and the rearward direction 38 is provided between the first fixed point 28 and the second fixed point 32 by deflection of the wire harness chain 34.

Referring to FIG. 2 and again to FIG. 1, wires which are included within the wire harness chain 34 include at least one power supply wire 40, at least one seat position sensor wire 42 and at least one seat position communication wire 44. The wire harness chain 34 is connected at the first fixed point 28, for example to the motor bridge 24 or to a bracket connected to the motor bridge 24 using a fastener 46 such as a push pin. The wire harness chain 34 is connected at the second fixed point 32, for example to vehicle floor structure such as to the floor two-bar 18 using a fastener 48 such as a push pin or a clip fastener.

Figure 2:
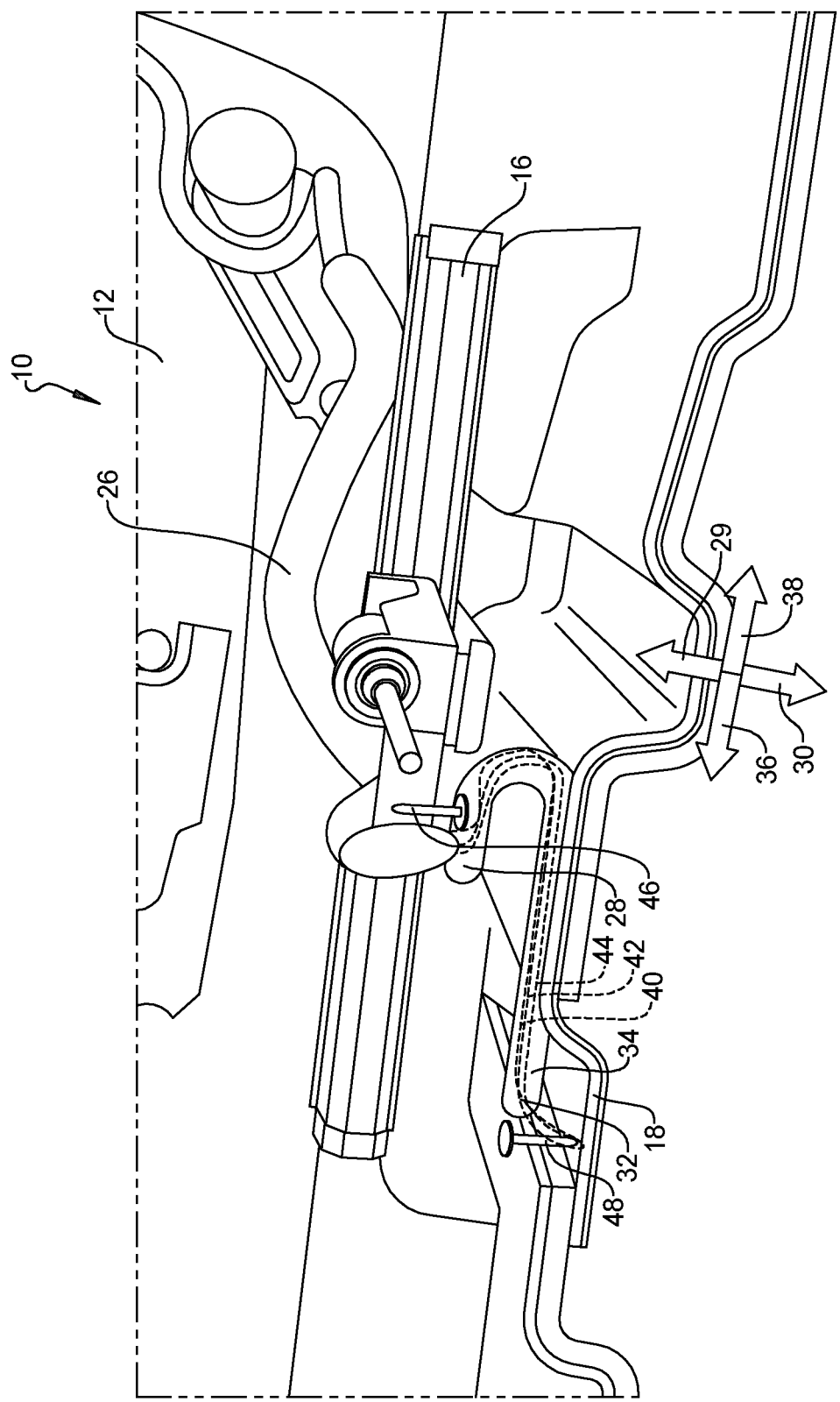
FIG. 2 is a front elevational perspective view of the vehicle seat wiring harness system of FIG. 1.
Figure 3:
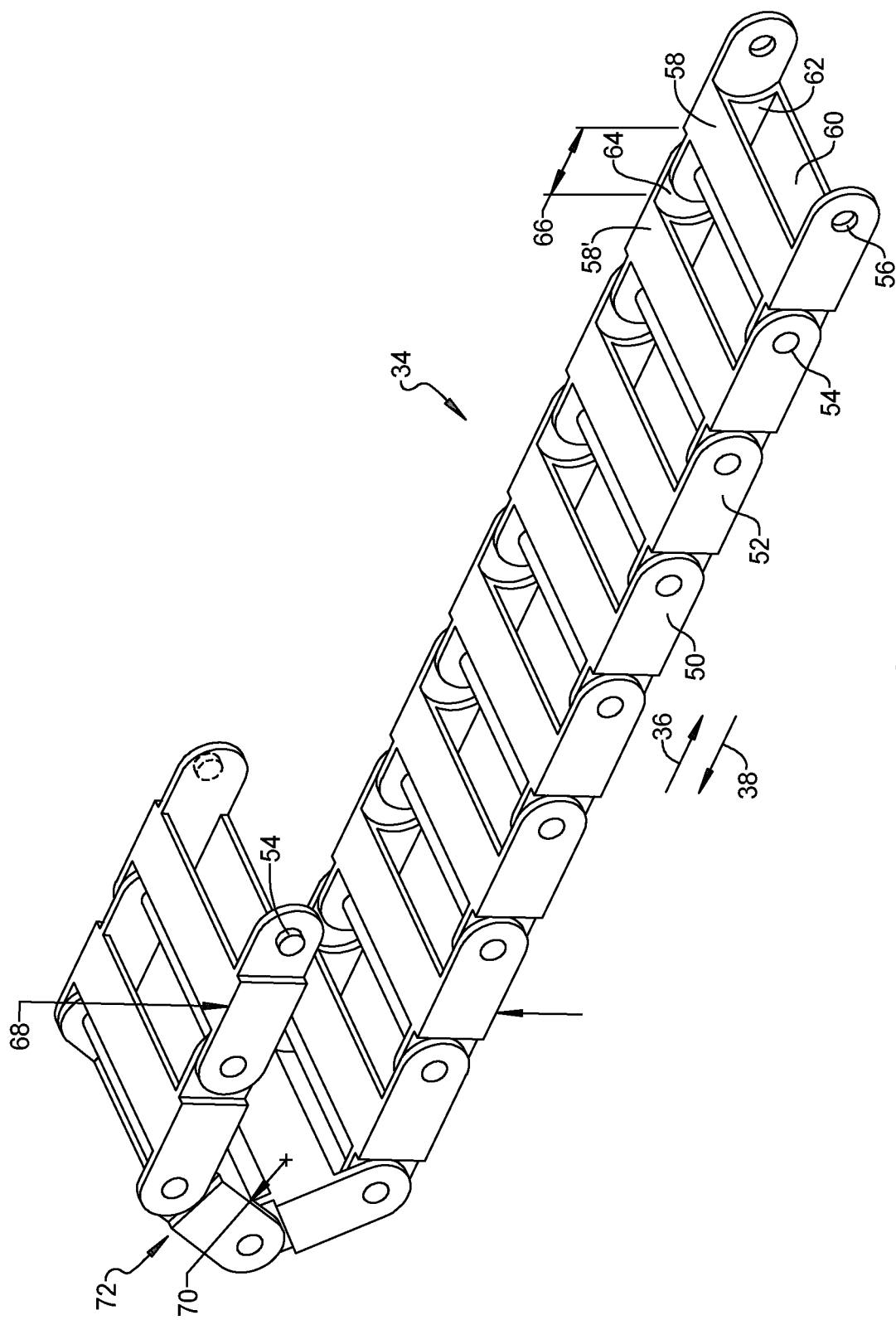
FIG. 3 is a rear perspective view of a wire harness chain of the vehicle seat wiring harness system of FIG. 1.

Referring to FIG. 3 and again to FIGS. 1 and 2, the wire harness chain 34 is shown in a reversed orientation from its orientation shown in FIGS. 1 and 2 to more clearly present individual details of the wire harness chain 34. It is noted the orientation shown in FIG. 3 can also be used. The wire harness chain 34 is made preferably from a low coefficient of friction material such as a polymeric material, or from a metal such as steel or aluminum. The wire harness chain 34 includes multiple links such as a first link 50 and a second link 52. The links are interconnected using a male pin 54 extending from opposed faces of one of the links which are individually received in opposed apertures 56 of the next successive one of the links. The links also individually include a first connecting wall 58 which is oppositely positioned with respect to a second connecting wall 60. A longitudinal cavity 62 is thereby created between the first connecting wall 58 and the second connecting wall 60 which extends longitudinally throughout a length of the wire harness chain 34. The wires shown and described in reference to FIG. 2 including the at least one power supply wire 40, the at least one seat position sensor wire 42 and the at least one seat position communication wire 44 are loosely routed from connections made at the second fixed point 32 through the longitudinal cavity 62 of the wire harness chain 34 to the first fixed point 28 where the wires are connected to similar service wires of the wiring bundle 26.

The wires are loosely routed through the longitudinal cavity 62 of the wire harness chain 34 in lieu of bundling and banding or connecting the wires to each other. As noted above, loosely routed is defined as the wires being individually positioned, without connection between or joining any of the wires within the wire harness chain 34. The wires therefore individually bend at all locations within the wire harness chain 34 when the wire harness chain 34 flexes as the vehicle seat displaces in the forward direction 36 and the rearward direction 38. Successive ones of the links of the wire harness chain 34 include an opening defining a gap 64 between successive ones of the first connecting walls and between successive ones of the second connecting walls, for example between first connecting walls 58, 58'. The gap 64 has a width 66 which is predetermined to preclude portions of the wires from extending through the gap 64 in the links past the first connecting walls or the second connecting walls as the wire harness chain 34 flexes.

A minimum flex width 68 of the wire harness chain 34 between opposed links during maximum flexure is predetermined to fit within a space envelope provided between the vehicle seat 12 and the vehicle floor or floor structure such as the floor two-bar 18. A minimum bend radius 70 of the wire harness chain 34 is therefore predetermined to ensure the minimum flex width 68 is obtained. The minimum bend radius 70 is also provided to ensure stress points causing wire fracture do not occur along the wires within the longitudinal cavity 62 during maximum flexure of the wire harness chain 34. According to several aspects, a flexure loop 72 is incorporated in the wire harness chain 34 between the first fixed point 28 and the second fixed point 32 during installation between the vehicle seat 12 and the vehicle floor member.

According to several aspects, the minimum flex width 68 of the wire harness chain 34 occurs between opposed links across the flexure loop 72 during the maximum flexure of the wire harness chain 34. Because the wire harness chain 34 is fixed at the first fixed point 28 and the second fixed point 32, a lateral position of the flexure loop 72 changes as the vehicle seat 12 displaces in the forward direction 36 and the rearward direction 38. Lateral movement of the flexure loop 72 does not reduce the minimum flex width 68.

A vehicle seat wiring harness system 10 of the present disclosure offers several advantages. These include providing increased flexibility by loosely routing wires leading to the wiring bundle 26 to allow the vehicle seat 12 to move forward and rearward. Protection is also provided for the wires by retaining the wires entirely within the longitudinal cavity 62 of the wire harness chain 34 with the wire harness chain 34 allowing for a minimum bend radius of the wires which does not induce stress fracture.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle seat wiring harness system, comprising:
    a vehicle seat having a wiring bundle supported by a structural member supporting the vehicle seat defining a first fixed point, the vehicle seat configured to move forward, rearward, upward and downward;
    a wire harness chain connected to the first fixed point and extending to a second fixed point directly connected to a vehicle floor member, the wire harness chain having a longitudinal cavity; and
    multiple wires loosely routed through the longitudinal cavity of the wire harness chain and connected to the wiring bundle,
    wherein the wire harness chain is connected at the first fixed point defining a motor bridge using a fastener and is freely able to move forward, rearward, upward, and downward with the vehicle seat.

2. The vehicle seat wiring harness system of claim 1, wherein the wire harness chain includes multiple links, the multiple links interconnected using a male pin extending from a face of one of the links received in an aperture of a next successive one of the links.

3. The vehicle seat wiring harness system of claim 2, wherein the links individually include a first connecting wall oppositely positioned with respect to a second connecting wall, the longitudinal cavity created between the first connecting wall and the second connecting wall and extending throughout a length of the wire harness chain.

4. The vehicle seat wiring harness system of claim 3, wherein a gap is created between the first connecting wall of successive links of the wire harness chain, the gap having a width predetermined to preclude portions of the multiple wires from extending through the gap in the links past the first connecting wall as the wire harness chain flexes.

5. The vehicle seat wiring harness system of claim 1, wherein a minimum bend radius of the wire harness chain is predetermined to ensure stress points causing fracture of the multiple wires do not occur along the multiple wires within the longitudinal cavity during a maximum flexure of the wire harness chain.

6. The vehicle seat wiring harness system of claim 1, wherein flexibility for the multiple wires routed through the wire harness chain allows for motion of the vehicle seat in a forward direction and an opposite rearward direction.

7. The vehicle seat wiring harness system of claim 6, wherein the flexibility for the multiple wires is provided between the first fixed point and the second fixed point by a predetermined maximum deflection of the wire harness chain.

8. The vehicle seat wiring harness system of claim 1, wherein the wire harness chain is connected at the second fixed point using a fastener.

9. The vehicle seat wiring harness system of claim 1, wherein the multiple wires within the wire harness chain include at least one power supply wire connected to an electrical motor providing motive force to displace the vehicle seat, at least one seat position sensor wire and at least one seat position communication wire.

10. A vehicle seat wiring harness system, comprising:
    a vehicle seat having a wiring bundle connected to at least an electrical motor energized to displace the vehicle seat in a forward direction, a rearward direction, an upward direction, and a downward direction, and having a first fixed point, wherein the first fixed point is defined as a motor bridge;
    a wire harness chain positioned between the first fixed point and a second fixed point directly connected to a vehicle two-bar or three-bar floor member, the wire harness chain including multiple links individually including a first connecting wall oppositely positioned with respect to a second connecting wall;
    a longitudinal cavity defined between the first connecting wall and the second connecting wall of the multiple links; and
    multiple wires loosely routed through the longitudinal cavity of the wire harness chain and connected to the wiring bundle, wherein the wire harness chain is connected at the first fixed point using a first fastener, wherein the wire harness chain is connected at the second fixed point defining using a second fastener, and wherein the wire harness chain is freely able to move in the forward direction, the rearward direction, the upward direction, and the downward direction with the vehicle seat.

11. The vehicle seat wiring harness system of claim 10, wherein the multiple links are interconnected using a male pin extending from a face of one of the links received in an aperture of a next successive one of the links.

12. The vehicle seat wiring harness system of claim 10, wherein a minimum flex width of the wire harness chain between opposed links during a maximum flexure of the wire harness chain is predetermined to fit within a space envelope provided between the vehicle seat and the vehicle floor member.

13. The vehicle seat wiring harness system of claim 12, wherein the minimum flex width defines a minimum bend radius of the wire harness chain.

14. The vehicle seat wiring harness system of claim 10, wherein a flexure loop is incorporated in the wire harness chain between the first fixed point and the second fixed point.

15. The vehicle seat wiring harness system of claim 14, wherein a lateral position of the flexure loop changes as the vehicle seat displaces in the forward direction and the opposed rearward direction.

16. A vehicle seat wiring harness system, comprising:
a vehicle seat having a wiring bundle connected to at least an electrical motor energized to displace the vehicle seat and a first fixed point in a forward direction, a rearward direction, an upward direction, and a downward direction;
a wire harness chain positioned between the first fixed point and a second fixed point directly connected to a vehicle floor member, the wire harness chain including multiple links individually including a first connecting wall oppositely positioned with respect to a second connecting wall;
a flexure loop incorporated in the wire harness chain between the first fixed point and the second fixed point between the vehicle seat and the vehicle floor member;
a longitudinal cavity defined between the first connecting wall and the second connecting wall extending through successive ones of the multiple links and the flexure loop; and
multiple wires loosely routed through the longitudinal cavity of the wire harness chain from the second fixed point to the first fixed point and connected to the wiring bundle, wherein the multiple wires within the wire harness chain include at least one power supply wire connected to an electrical motor providing motive force to displace the vehicle seat, at least one seat position sensor wire and at least one seat position communication wire, and wherein the wire harness chain is freely able to move in the forward direction, the rearward direction, the upward direction, and the downward direction with the vehicle seat.

17. The vehicle seat wiring harness system of claim 16, wherein the flexure loop displaces during operation of the electrical motor to displace the vehicle seat.

18. The vehicle seat wiring harness system of claim 17, wherein a minimum flex width of the wire harness chain between opposed links across the flexure loop during a maximum flexure of the wire harness chain is predetermined to fit within a space envelope provided between the vehicle seat and the vehicle floor member.

* * * * *